United States Patent [19]
Van Slambrouck

[11] 3,885,690
[45] May 27, 1975

[54] TRAILER FOR SNOWMOBILES

[75] Inventor: James J. Van Slambrouck, Riverview, Mich.

[73] Assignee: Warren Burke, Lincoln Park, Mich.

[22] Filed: Dec. 13, 1973

[21] Appl. No.: 424,219

Related U.S. Application Data

[63] Continuation of Ser. No. 236,381, March 20, 1972.

[52] U.S. Cl. .............................. 214/506; 296/1 A
[51] Int. Cl. ........................................... B60p 1/28
[58] Field of Search ...... 214/505, 506, 85; 296/1 A; 105/368 R, 368 T

[56] References Cited
UNITED STATES PATENTS

| | | | |
|---|---|---|---|
| 1,890,918 | 12/1932 | Stipes et al. | 105/368 R |
| 2,078,700 | 4/1937 | Tobin | 105/368 R |

FOREIGN PATENTS OR APPLICATIONS

| | | | |
|---|---|---|---|
| 344,909 | 3/1931 | United Kingdom | 105/368 R |

Primary Examiner—Albert J. Makay
Attorney, Agent, or Firm—Whittemore, Hulbert & Belknap

[57] ABSTRACT

A trailer adapted to carry snowmobiles in tandem. A front snowmobile is secured on the deck of the trailer with its rear end suspended from an inverted generally U-shaped frame. A rear snowmobile is secured on the deck with its forward end nested under the elevated rear end of the front snowmobile.

4 Claims, 5 Drawing Figures

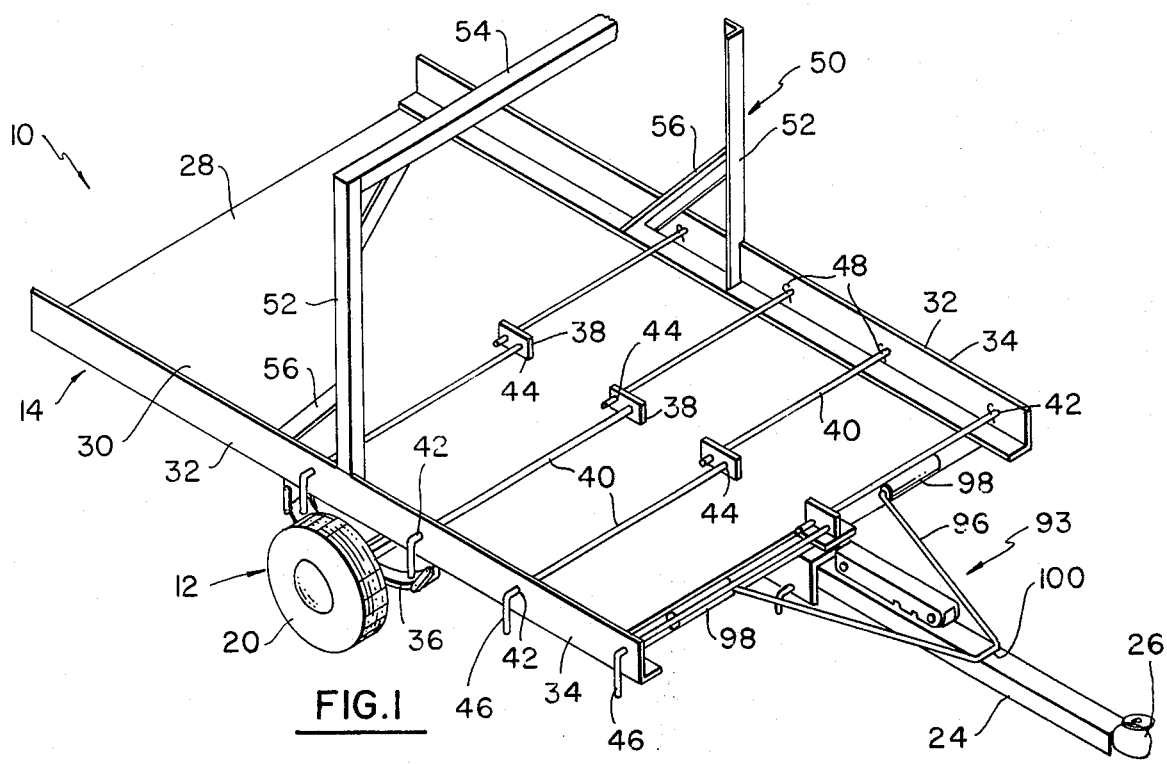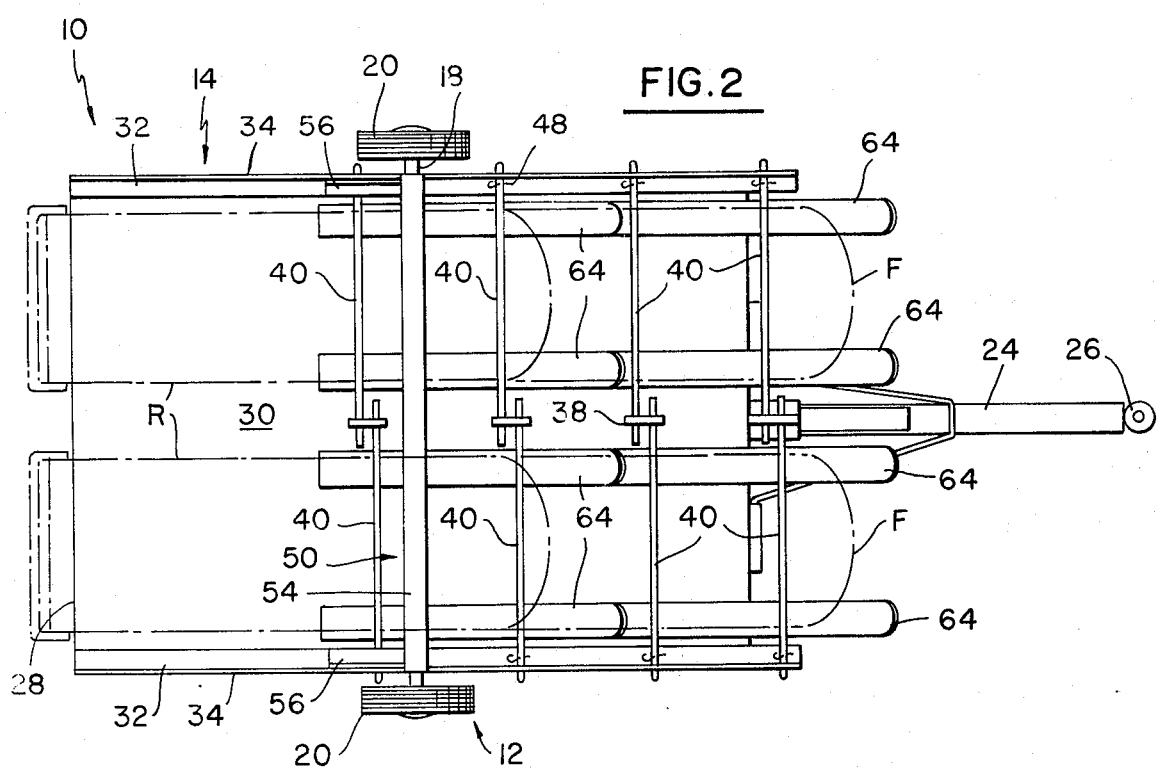

TRAILER FOR SNOWMOBILES

This is a continuation of application Ser. No. 236,381, filed Mar. 20, 1972.

BACKGROUND AND SUMMARY OF THE INVENTION

Trailers have been designed to carry two or more snowmobiles. However, to the best of my knowledge no one has ever designed a trailer which would carry snowmobiles in nested relation. My trailer design considerably reduces the amount of space required to accommodate the snowmobiles, primarily because of this nested relationship, and thereby makes it possible to keep the overall dimensions of the trailer to a minimum.

In accordance with a preferred embodiment of my invention, the rear end of a front snowmobile carried on the deck of the trailer is elevated by having its rear end suspended from an inverted generally U-shaped frame. The front end of a rear snowmobile may then be nested under the elevated rear end of the front snowmobile.

As a further feature of my invention, I have provided novel means for locking the snowmobile trailer in a tilted position for loading and unloading. Specifically, the locking means includes a locking detent on the draft bar of the trailer which is engageable with a part on the trailer to lock it in position for loading.

Other objects and features of my invention will become more apparent as the following description proceeds, especially when considered with the accompanying drawings, wherein:

FIG. 1 is a perspective view of a trailer for carrying snowmobiles constructed in accordance with my invention.

FIG. 2 is a top plan view of the trailer showing four snowmobiles in dotted lines mounted thereon in position to be transported.

Figure 3:
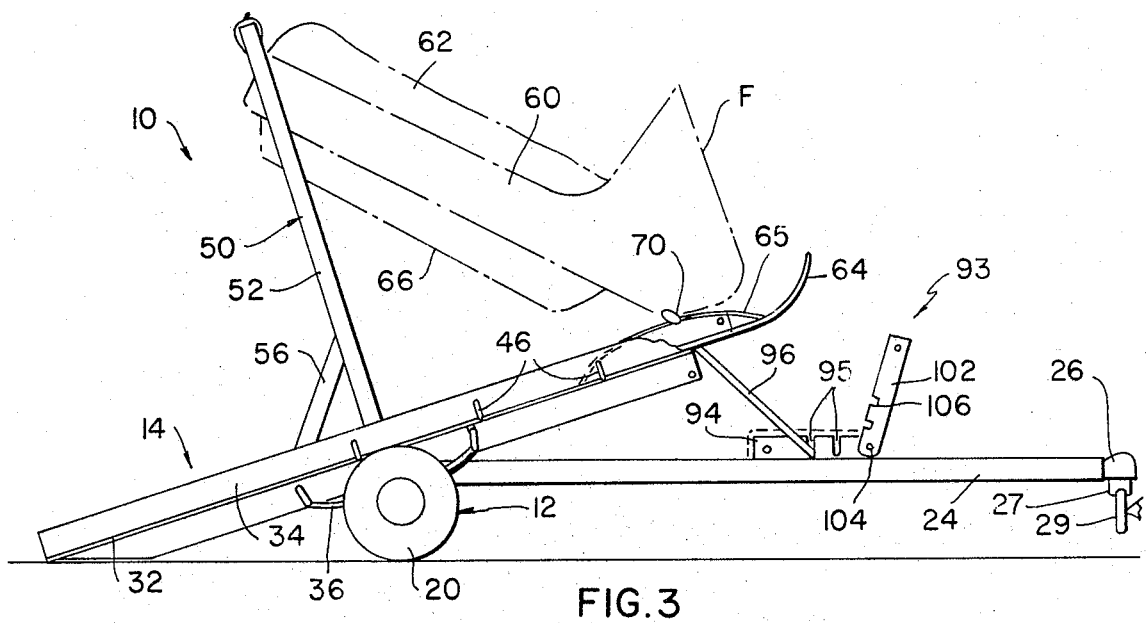
FIG. 3 is a side elevational view showing the trailer in position for loading, and illustrating in dotted lines a front snowmobile in loaded position.

Referring now more particularly to the drawings, the trailer is generally designated 10 and comprises a wheeled supporting assembly 12 and a supported assembly 14.

The supporting assembly 12 includes a transverse axle 18 having ground-engaging wheels 20 at the ends. The axle housing is designated 22. An elongated draft bar 24, by means of which the trailer is attached to and drawn behind a towing vehicle, is rigidly secured at one end where indicated at 25 to the midpoint of the axle housing and extends forwardly on the longitudinal center line of the trailer. A coupling device 26 is provided at the front end of the draft bar for attachment to a complementary member 27 on the bumper 29 of a towing vehicle fragmentarily shown in FIGS. 3 and 4.

The supported assembly 14 comprises a rectangular bed 28 defining an elongated deck 30 which is generally rectangular in shape and provides a flat supporting surface for the snowmobiles. A pair of elongated angle members 32 are secured to the bed 28 along opposite side edges of the deck with one flange 34 of each angle member extending vertically upwardly along the full length of the deck.

Figure 4:
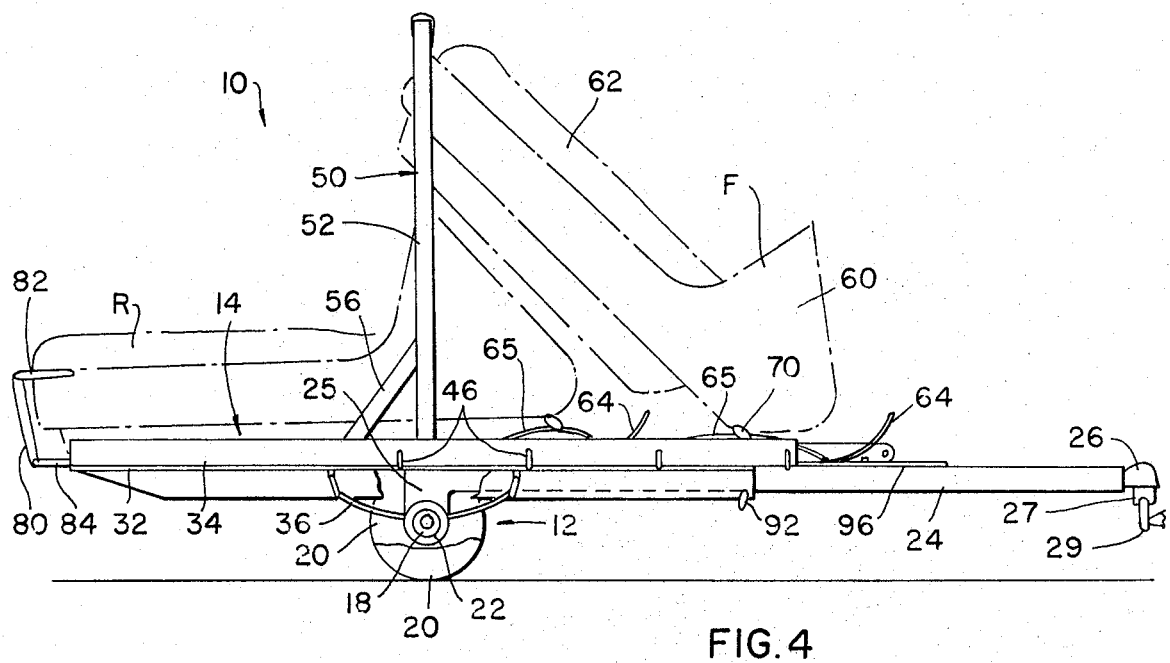
FIG. 4 is a side elevational view similar to FIG. 3, but showing the trailer in the normal horizontal position it assumes when being drawn behind a towing vehicle, illustrating the front and rear snowmobiles loaded on the deck of the trailer in nested position.

The bed 28 has laterally spaced leaf springs 36 at the side edges which are journaled on the axle housing 22 so that the entire supported assembly 14 can tilt or rock about the axle 18 from the FIG. 3 position to the FIG. 4 position.

Means are provided for securing the skis of the snowmobiles down upon the deck 30, such means comprising the brackets 38 and the hold-down rods 40. The brackets 38 are mounted midway between the side edges of the deck 30 in spaced relation along the length thereof. The rods 40 slide through apertures 42 in the upright flanges 34 of angles 32 and through apertures 44 in the brackets 38. The rods have outer end portions which are turned at right angles to provide handles 46. The rods are shown in their operative position for holding down the skis of snowmobiles loaded on the trailer and may be held from accidental removal by being threaded into the apertures 44 in brackets 38, for example, or alternatively by removable cotter pins 48 extending through transverse holes in the tie rods near flanges 34 on the inboard sides thereof.

The trailer is provided with an inverted generally U-shaped frame 50 which is composed of the vertical uprights 52 and the horizontal transverse bar 54 connecting the upper ends of the uprights. The uprights and transverse bar may be of simple angle iron construction. Uprights 52 are secured at their lower ends to the angle members 32 of the bed 28 about midway in the length of the deck. Such uprights extend vertically upwardly from the deck and for strength purposes are preferably reinforced by suitable braces 56. The inverted U-shaped frame 50 provides a rigid support for securing the rear ends of the two front snowmobiles in elevated position.

FIGS. 2 and 4 show a trailer properly loaded in accordance with my invention with four snowmobiles, two front and two rear, with the front ends of the rear snowmobiles nested under the rear ends of the two in front. The snowmobiles are here shown as being of identical construction, F designating the two front snowmobiles and R designating the two in the rear. Each snowmobile has a vehicle frame 60 provided with a cushion or seat 62, front steering skis 64, and an endless track 66 suitably powered to propel the snowmobile along the course determined by the skis 64. The skis 64 have arched mounting members 65 which are connected at their ends to the skis and are secured to the vehicle frame at 70 permitting up and down pivotal movement of the skis about a transverse axis from the position of FIG. 3 to that of FIG. 4.

Figure 5:
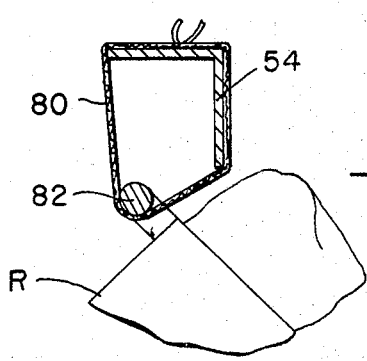
FIG. 5 is an enlarged fragmentary elevational view of a portion of FIGS. 3 and 4 with parts in section.

When properly loaded on the trailer as in FIGS. 2 and 4, the two front snowmobiles have their skis 64 resting on the deck under the two sets of rods 40 nearest the front of the trailer. Preferably one or two of such rods extend under the arched ski mounting members 65. The two rear snowmobiles have their skis resting upon the deck 30 under the two sets of rods 40 nearer the rear edge of the deck 30 in the same manner as the skis of the front snowmobiles. The rear ends of the front snowmobiles F are suspended in elevated position as shown in FIGS. 3 and 4 from the transverse bar 54 by suitable ties 80 which may be buckle straps or in the simplest form may simply be ropes or cords. As seen in FIG. 5, each snowmobile has a handle 82 in the form of a C-shaped grip secured to the rear of the vehicle frame. The ties 80 are looped around the handles 82 and around the transverse bar 54 and tied to secure the rear ends of the two front snowmobiles in suspended position spaced above the deck of the trailer. The rear ends of the rear snowmobiles are tied to the trailer bed by suitable ties 80 like those previously described which loop through the handles 82 and through C-shaped handles 84 on the rear end of the trailer bed. It will be noted that the front ends of the two rear snowmobiles are nested under the elevated rear ends of the two front snowmobiles to make the best possible use of the available space.

The trailer bed has a longitudinally extending downwardly opening channel 90 secured to the underside thereof on the center line of the trailer. This channel fits over the draft bar 24 in the normal horizontal position of FIG. 4. In this position, a removable pin 92 passes through the channel flanges beneath the draft bar to retain the trailer bed horizontal. This pin 92 is removed to tilt the trailer bed to the FIG. 3 position for loading and unloading.

The trailer bed is held or locked in the tilted FIG. 3 position for loading by a locking device 93 including a locking detent or bar 94 disposed lengthwise of and secured to the upper surface of the draft bar 24. This locking bar 94 has notches 95 spaced apart along its length. The locking device also includes a generally V-shaped bracket 96 having out-turned ends pivoted at 98 to the front edge of the bed 28 for vertical swinging about a horizontal transverse axis. The legs of the V-shaped bracket 96 are connected by a central horizontal bar 100 adapted to fit in any one of the notches 95. A clamp 102 of inverted channel form is pivoted at 104 to the front end of locking bar 94 to swing from the open position shown in solid lines in FIG. 3 to the closed position shown in dotted lines in which it fits over the locking bar. The side flanges of clamp 102 are notched at 106 along the length of the clamp at points spaced to correspond with the spacing of the notches 95 so as to clear the legs of the bracket 96 when the bracket is received in a notch 95 as in FIG. 3 and the clamp is closed. By selecting one of the notches 95 in which to place the bracket 96, the trailer bed may be tilted to the degree desired for loading or unloading and held locked in that position. The trailer is most conveniently loaded when the rear of the bed 28 is at ground level.

To load the trailer, the bed 28 is tilted to the FIG. 3 position and held there by the locking device 93. Preferably, clamp 102 is closed to secure the locking of the bed in tilted position. The rods 40 are removed. A snowmobile is driven onto one side of deck 30 from the lower rear end of the trailer bed to a front position. The two forwardmost rods 40 at the side of the deck are installed and secured by cotter pins as in FIGS. 1 and 2 over the skis 64 and preferably under the arched mounting members 65. The rear end of this snowmobile is then lifted and tied to the transverse bar 54 of frame 50 by ties 80, as shown in FIG. 3. A second snowmobile is then driven onto the same side of the deck from the lower rear end to a rear position behind the first loaded snowmobile and with its front end nested under the elevated rear end of the front snowmobile as in FIG. 4. The two rearmost rods 40 at the side of the deck being loaded are installed as in FIGS. 1 and 2 and cotter pins inserted. The rear end of the loaded rear snowmobile is then tied down to handles 84 at the rear of the trailer bed by ties 80.

Thereafter the other front and rear snowmobiles may be loaded on the opposite side of the deck in the same manner as the first two. The locking device may be released by opening clamp 102 and lifting bracket 96 out of its notch, after which the trailer bed is swung to the horizontal position of FIG. 4 for transit and locked by pin 96.

It will be understood that the trailer may be unloaded by a reversal of the procedure outlined above. Both loading and unloading may be carried out while the trailer is hitched to the towing vehicle.

What I claim as my invention is:

1. A trailer for carrying snowmobiles in tandem, comprising a supporting assembly having ground-engaging wheels, a supported assembly mounted on said supporting assembly comprising a deck, and means for securing snowmobiles in tandem on said deck with their longitudinal axes extending lengthwise of said deck comprising means for securing the forward end of a front snowmobile down on said deck, means for securing the rear end of the front snowmobile in elevated position spaced above said deck comprising an inverted U-shaped frame having laterally spaced uprights mounted on opposite sides of and extending upwardly from said deck, a transversely extending bar connecting the upper ends of said uprights and disposed above the elevated rear end of the front snowmobile, means for suspending the rear end of the front snowmobile from said transversely extending bar, means for securing a rear snowmobile down on said deck with its forward end nested under the elevated rear end of the front snowmobile, an axis extending transversely of said trailer for tipping said supported assembly, and means for locking said supported assembly in a first position in which said deck is substantially horizontal and for locking said supported assembly in position for loading in which the rear end of said deck is tilted adjacent ground level.

2. The trailer defined in claim 1, wherein said supporting assembly includes a longitudinally extending draft bar adapted to be connected to a towing vehicle, and said locking means includes a locking detent on said draft bar and a part on said supported assembly engageable with said locking detent to lock said supported assembly in position for loading as aforesaid, said locking detent including a plurality of notches spaced apart lengthwise of said draft bar, and pivoted clamping means for securing said part of said supported assembly in any selected one of said notches.

3. A trailer for carrying snowmobiles in tandem, comprising a supporting assembly having ground-engaging wheels, a supported assembly mounted on said supporting assembly comprising a deck, means for securing two front snowmobiles side by side on said deck with their longitudinal axes extending lengthwise of said deck comprising means for securing the forward ends of said two front snowmobiles down on said deck, means for securing the rear ends of said two front snowmobiles in elevated positions spaced above said deck comprising an inverted U-shaped frame having laterally spaced uprights mounted on opposite sides of and extending upwardly from said deck, a transversely extending bar connecting the upper ends of said uprights and disposed above the elevated rear ends of said two front snowmobiles, means for suspending the rear ends of said two front snowmobiles from said transversely extending bar, means for securing two rear snowmobiles side by side on said deck respectively in tandem relationship with said two front snowmobiles and with their longitudinal axes extending lengthwise of said deck and their forward ends nested under the elevated rear ends of said two front snowmobiles, an axis extending transversely of said trailer for tipping said supported assembly, and means for locking said supported assembly in a first position in which said deck is substantially horizontal and for locking said supported assembly in position for loading in which the rear end of said deck is tilted adjacent ground level.

4. A trailer for carrying snowmobiles in tandem, said trailer having means for attachment to a towing vehicle and comprising a supporting assembly having ground-engaging wheels, a supported assembly mounted on said supporting assembly, said supported assembly being open-sided and open-topped and comprising a deck, means for securing two front snowmobiles side by side on said deck with their longitudinal axes extending lengthwise of said deck comprising means for engaging and holding the front steering skis of said two front snowmobiles down on said deck, means for securing the rear ends of said two front snowmobiles in elevated positions spaced above said deck comprising an inverted U-shaped frame having laterally spaced uprights mounted on opposite sides of and extending upwardly from said deck, a transversely extending bar connecting the upper ends of said uprights and disposed above the elevated rear ends of said two front snowmobiles, means depending from said bar for suspending the rear ends of said two front snowmobiles from said transversely extending bar, and means for securing two rear snowmobiles side by side on said deck respectively in tandem relationship with said two front snowmobiles and with their longitudinal axes extending lengthwise of said deck and their forward ends nested under the elevated rear ends of said two front snowmobiles.

* * * * *